United States Patent
Eppert et al.

(10) Patent No.: US 6,585,324 B2
(45) Date of Patent: Jul. 1, 2003

(54) ACTIVATION DEVICE FOR A VEHICLE SEAT ADJUSTER

(75) Inventors: Dietmar Eppert, Remscheid (DE); Martin Becker, Wuppertal (DE); Heinz Voss, Leverkusen (DE); Christoph Leibeling, Hennef (DE); Markus Fath, Wuppertal (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 10/230,755

(22) Filed: Aug. 29, 2002

(65) Prior Publication Data

US 2003/0006642 A1 Jan. 9, 2003

Related U.S. Application Data

(63) Continuation of application No. PCT/EP01/13642, filed on Nov. 23, 2001.

(30) Foreign Application Priority Data

Dec. 22, 2000 (DE) .......................................... 100 64 474

(51) Int. Cl.[7] .............................................. A47B 97/00

(52) U.S. Cl. ............... 297/463.1; 297/366; 297/378.11; 297/216.13

(58) Field of Search .............................. 297/463.1, 367, 297/368, 366, 378.11, 216.13, 216.14, 216.1, 216.15

(56) References Cited

U.S. PATENT DOCUMENTS

| 4,118,067 A | * | 10/1978 | Tanaka |
|---|---|---|---|
| 4,733,912 A | * | 3/1988 | Secord |
| 4,801,177 A | * | 1/1989 | Kanazawa |
| 4,995,669 A | | 2/1991 | Croft |
| 5,733,008 A | | 3/1998 | Tame |

FOREIGN PATENT DOCUMENTS

| DE | 19628716 | | 1/1998 |
|---|---|---|---|
| JP | 5-176819 | * | 7/1993 |

* cited by examiner

*Primary Examiner*—Laurie K. Cranmer
(74) *Attorney, Agent, or Firm*—Alston & Bird LLP

(57) ABSTRACT

In an activation device for a vehicle seat adjuster, particularly a motor vehicle seat, possessing a pivotable hand lever (12) for manual activation, which is supported eccentrically and working in conjunction with the adjuster (7), an acceleration-sensitive feature (24) is provided to immobilize and/or lock the hand lever (12) in the event of a crash.

21 Claims, 1 Drawing Sheet

ACTIVATION DEVICE FOR A VEHICLE SEAT ADJUSTER

CROSS-REFERENCE TO RELATED APPLICATION

This is a continuation of International Application No. PCT/EP01/13642, which was filed Nov. 23, 2001, published in German on Jul. 4, 2002, and is incorporated herein by reference.

BACKGROUND OF THE INVENTION

The present invention relates to an activation device for a vehicle seat adjuster.

A known vehicle seat adjuster includes two lock fittings that are unlocked with a pivoting movement of an activation device that is in the form of a hand lever, so that the seat back can be pivoted. Because the hand lever is a one-armed design to save space, i.e. it is pivotably supported at a position that is distant from its center of gravity, there is a risk, in the event of a crash, that the hand lever, by reason of its inertia, will perform an unintended pivoting movement, thereby unlocking the lock fittings.

Therefore, for an activation device for a lengthwise adjuster with a pivotable lever in the DE 196 28 716 A1, it is suggested that a spring is provided whose characteristic force curve rises sharply in the initial phase and then, after reaching a local maximum, shows a negative gradient allowing easy activation. However, in the event of sufficiently high crash forces, even the local maximum can be overcome, allowing the adjuster to unlock.

BRIEF SUMMARY OF THE INVENTION

One aspect of the present invention is the provision of improvements to activation devices for vehicle seat adjusters. In accordance with this aspect, the activation device includes an eccentrically mounted hand lever for pivoting in response to manual activation of the hand lever, so that the pivoting of the hand lever unlocks the associated adjuster to thereby enable operation of the unlocked adjuster. The activation device also includes an acceleration-sensitive device operative for immobilizing and/or locking the hand lever in the event of a crash, whereby the unlocking of the adjuster is prevented in response to the crash. Preferably, the acceleration-sensitive device is mounted for moving from a first predetermined position into a second predetermined position in response to the crash; with the acceleration-sensitive device being operative for allowing the pivoting of the hand lever while the acceleration-sensitive device is in the first predetermined position, and the acceleration-sensitive device being operative for restricting the pivoting of the hand lever while the acceleration-sensitive device is in the second predetermined position.

By virtue of the fact that there is an acceleration-sensitive device to immobilize and/or lock the hand lever in the event of a crash, the hand lever, in the event of a crash, will be secured independently of the magnitude of the crash forces, so that the adjuster does not unlock. With reference to the hand lever being eccentrically mounted for pivoting, this means that it is pivotably supported at a position that is distant from its center of gravity. The acceleration-sensitive device will preferably be a pivotably supported pendulum element, which is also preferably pivotably supported at a position that is distant from its center of gravity in order to react sensitively to accelerations in a simple fashion. For modular construction, i.e. in order to make a single-unit activation device, the pendulum element is preferably pivotably mounted on the hand lever. A more rapid response of the pendulum element in relation to the hand lever is obtained by virtue of the pendulum element having less mass than the hand lever.

In a preferred construction, the pendulum element, in the event of a crash, works in conjunction with a frame-fixed component in order to lock and/or immobilize the hand lever. For this purpose, the pendulum element preferably has a convex-shaped rim which, when bearing against the frame-fixed component, produces a locking effect. The frame-fixed component, which is preferably also convex, may be an adjuster-fixed bolt, for example, which, when used, also serves as a stop for the hand lever.

The activation device, according to the invention, can be used for a vehicle seat, for example in an inclination adjuster, a height adjuster, a length adjuster, or in an unlocking device for seat legs—hereinafter also called an adjuster.

BRIEF DESCRIPTION OF THE SEVERAL VIEWS OF THE DRAWINGS

The invention is explained in greater detail with reference to an exemplary embodiment illustrated in the drawings, wherein.

DETAILED DESCRIPTION OF THE INVENTION

Figure 1:
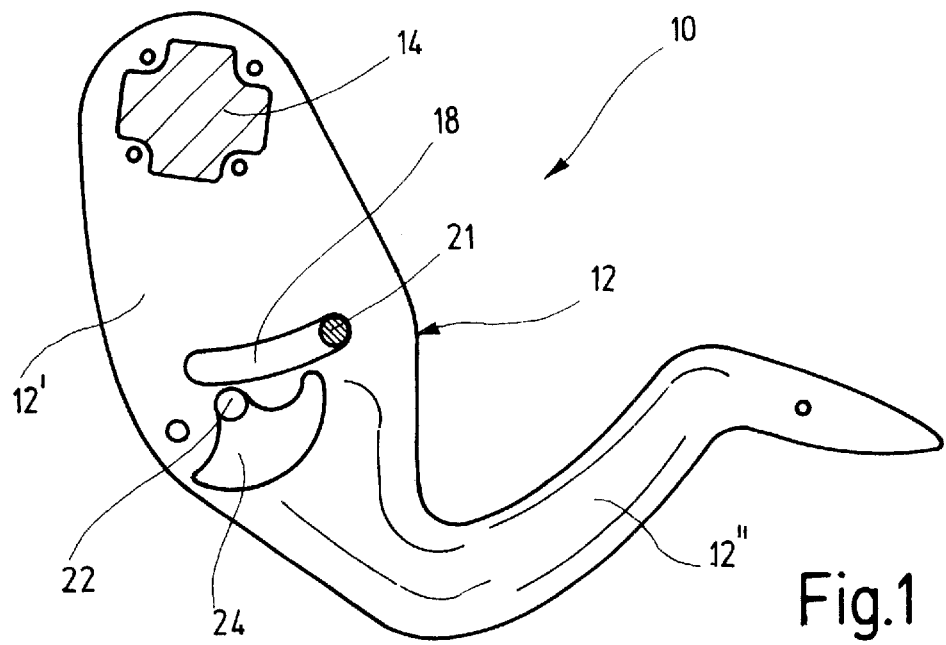
FIG. 1 is a schematic lateral view of the exemplary embodiment in the resting position.
Figure 2:
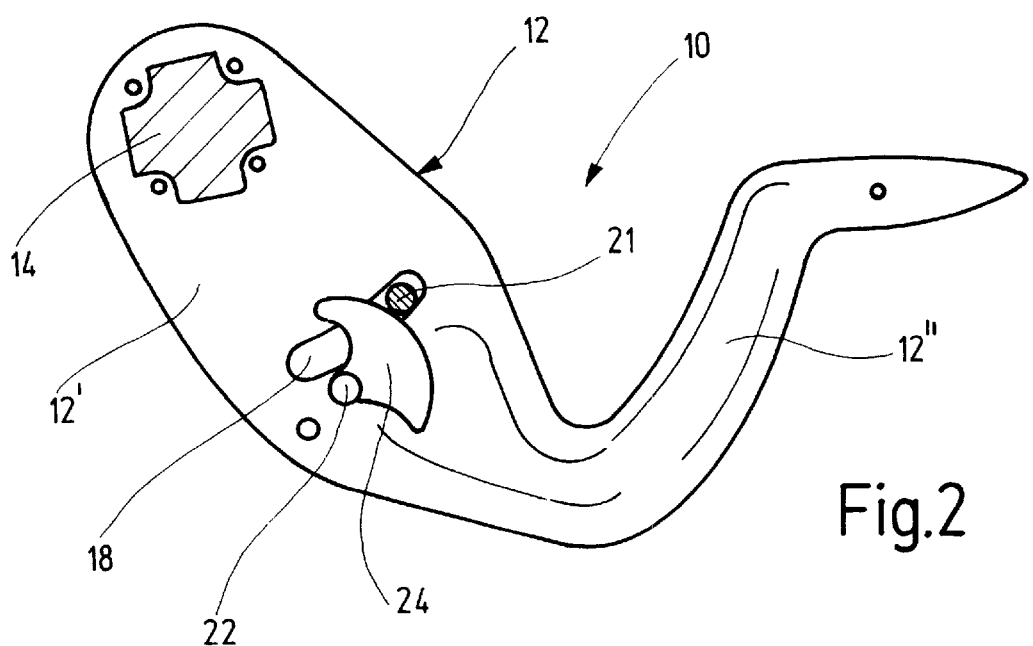
FIG. 2 represents FIG. 1 in the event of a crash.
Figure 3:
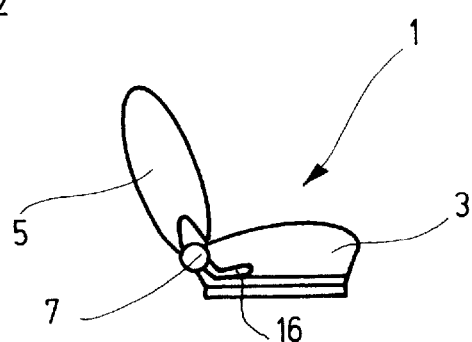
FIG. 3 is a schematic lateral view of a vehicle seat.

A vehicle seat 1 for a motor vehicle is equipped with a seat component 3 and a seat back 5, which is connected with the seat component 3 on each side of the vehicle seat 1 by means of an adjuster 7 being designed as a lock fitting. By unlocking the adjusters 7, the seat back 5 can be pivoted to the chosen inclination. The adjusters 7 are unlocked by means of an activation device 10 on one side of the vehicle seat 1.

The activation device 10 has a hand lever 12 which is mounted for pivoting relative to the adjusters 7 and fixedly mounted on a shaft 14. The shaft 14 is working in conjunction with the adjusters 7 in such a way that, when the shaft 14 rotates, corresponding locks are moved by cam discs in a lower part of the adjuster fittings 7 and fall into or out of dentations in the upper part of the fitting. Around the shaft 14, the hand lever 12 has a tongue-shaped area 12' pointing radially in one direction; in continuation, pointing more in a tangential direction, there is an arm-shaped area 12". The arm-shaped area 12" has a user-accessible handgrip 16 pointing in the direction of travel, for moving the hand lever 12.

In the tongue-shaped area 12' of the hand lever 12 there is a slotted link 18 in the shape of a segmental arch, which has the shaft 14 as its center. The slotted link 18 embraces a bolt 21 which is firmly fixed to the lower part of the adjuster 7 located in direct proximity to the hand lever 12, i.e. fixed to the seat, projecting from this adjuster 7, parallel to the shaft 14. The bolt 21 is inside the slotted link 18, which has an upper end that is forward with respect to the direction of travel of the automobile. The hand lever 12 is designed for an upward activation movement while the bolt 21 is at the upper end of the slotted link 18.

A small pendulum element (segment) 24 is pivotably mounted on a pin 22 at the lower edge of the slotted link 18 near its lower end, with the lower end of the slotted link being located further back than the upper end of the slotted link (relative to the direction of travel). In a resting position, the approximately quarter sector, sickle-shaped pendulum element 24 that is mounted near the center of the circle, i.e. distant from its center of gravity, hangs below the slotted link 18. The slotted link 18, however, is within the pivoting range of the pendulum element 24.

When the activation device 10 is used, the hand lever 12 is moved out of its resting position in such a way that the slotted link 18 is shifted over the bolt 21, which serves as a stop, until the bolt comes close to the lower end of the slotted link 18. Thereafter, the lever 12 is moved-back into the resting position (shown in FIG. 1). The hand lever 12 is preferably held in the resting position by a spring.

In the event of a crash, the inertia of the movably mounted and friction-held components causes them to be decelerated later than the frame-fixed components, i.e. to be accelerated when considered within their reference system. Therefore, in the exemplary embodiment, in the event of a head-on collision, the hand lever 12 and the pendulum element 24, both of which are eccentrically mounted, i.e. mounted at a position that is distant from their center of gravity, are moved forward relative to the seat-fixed bolt 21. Because the mass of the pendulum element 24 is much smaller than the mass of the hand lever 12, the pendulum element 24 is accelerated more, thus much more rapidly causing a pivoting movement towards the front and then upward. This brings the pendulum element 24 within the range of the slotted link 18. The dimensions of the pendulum element 24 and the position of the pin 22 are chosen so that the convex outer rim of the pendulum element 24 comes into contact with the bolt 21, thereby immobilizing the hand lever 12 for a short time. Means may be provided, such as a stop at the hand lever 12, to prevent further pivoting of the pendulum element 24 caused by its momentum, in case the desired relative position of the pendulum element 24 and bolt 21 has not yet been reached.

In this position, the tangential surfaces in contact with the pendulum element 24 and the bolt 21 are aligned almost vertically relative to the connecting line between the pin 22 and the bolt 21, so that a strong friction grip, or even nearly a profile grip, is produced. The friction grip is sufficient to keep the forces applied by the hand lever 12 to the pendulum element 24 from pushing the pendulum element 24 aside, i.e. the hand lever 12 cannot make a pivoting movement until the acceleration peak has leveled off. Following that, the pendulum element 24 can pivot downward again, the still-active relative acceleration no longer being sufficient to pivot the hand lever 12. This keeps the adjusters 7 from unlocking.

That which is claimed:

1. An activation device for an adjuster of a vehicle seat, with the activation device being responsive to a crash of a vehicle carrying the activation device, the activation device comprising:
   a hand lever eccentrically mounted for pivoting in response to manual activation of the hand lever, wherein the pivoting of the hand lever is operative to unlock the adjuster and thereby enable operation of the unlocked adjuster; and
   an acceleration-sensitive device operative for becoming activated in response to the crash, so as to restrict the pivoting of the hand lever in response to the crash, whereby the unlocking of the adjuster is prevented in response to the crash.

2. An activation device according to claim 1, wherein the acceleration-sensitive device is a pendulum that is mounted for pivoting from a first predetermined position into a second predetermined position in response to the crash, wherein the pendulum is operative for:
   allowing the pivoting of the hand lever, so as to allow the unlocking of the adjuster, while the pendulum is in the first predetermined position, and
   preventing the unlocking of the adjuster, by restricting the pivoting of the hand lever, while the pendulum is in the second predetermined position.

3. An activation device according to claim 2, wherein the pendulum is eccentrically mounted for pivoting from the first predetermined position to the second predetermined position.

4. An activation device according to claim 2, wherein the pendulum is mounted on the hand lever for pivoting relative to the hand lever from the first predetermined position to the second predetermined position.

5. An activation device according to claim 2, wherein the pendulum has a smaller mass than the hand lever.

6. An activation device according to claim 5, wherein the pendulum and the hand lever are configured so that in response to the crash, the pivoting of the pendulum is more rapid than any pivoting of the hand lever.

7. An activation device according to claim 2, wherein the pendulum has a convex-shaped rim.

8. An activation device according to claim 2, further comprising a fixed component, wherein the hand lever and the pendulum are mounted for pivoting relative to the fixed component, and the pendulum works in conjunction with the fixed component to restrict the pivoting of the hand lever while the pendulum is in the second predetermined position, so that unlocking of the adjuster is prevented.

9. An activation device according to claim 8, wherein the fixed component is a bolt of the adjuster.

10. An activation device according to claim 9, wherein there is a slot in the hand lever, and the bolt of the adjuster extends into the slot.

11. An activation device according to claim 8, wherein:
    the pendulum is not in contact with the fixed component while the pendulum is in the first predetermined position, and
    the pendulum engages the fixed component while the pendulum is in the second predetermined position, and the engagement between the pendulum and the fixed component prevents pivoting of the hand lever so that unlocking of the adjuster is prevented.

12. An activation device according to claim 11, wherein the pendulum has a convex-shaped rim that engages the fixed component while the pendulum is in the second predetermined position.

13. An activation device according to claim 1, in combination with the adjuster and the vehicle seat, with the adjuster adjustably connecting components of the vehicle seat.

14. An activation device for an adjuster of a vehicle seat, with the activation device being responsive to a crash of a vehicle carrying the activation device, the activation device comprising:
    a hand lever eccentrically mounted for pivoting in response to manual activation of the hand lever, wherein the pivoting of the hand lever is operative to unlock the adjuster and thereby enable operation of the unlocked adjuster; and
    an acceleration-sensitive pendulum that is eccentrically mounted to the hand lever for pivoting relative to the hand lever from a first predetermined position into a second predetermined position in response to the crash, wherein the pendulum is operative for:

allowing the pivoting of the hand lever, so as to allow the unlocking of the adjuster, while the pendulum is in the first predetermined position, and preventing the unlocking of the adjuster, by restricting the pivoting of the hand lever, while the pendulum is in the second predetermined position.

15. An activation device according to claim 14, wherein the pendulum and the hand lever are configured so that in response to the crash, the pivoting of the pendulum is more rapid than any pivoting of the hand lever.

16. An activation device according to claim 14, further comprising a fixed component, wherein:

the hand lever and the pendulum are both eccentrically mounted for pivoting relative to the fixed component, the pendulum and the hand lever are configured so that in response to the crash, the pendulum pivots more rapidly relative to the fixed component than any pivoting of the hand lever relative to the fixed component, the pendulum is not in contact with the fixed component while the pendulum is in the first predetermined position, and the pendulum engages the fixed component while the pendulum is in the second predetermined position, and the engagement between the pendulum and the fixed component prevents pivoting of the hand lever so that unlocking of the adjuster is prevented.

17. An activation device according to claim 16, wherein the pendulum has a convex-shaped rim that engages the fixed component while the pendulum is in the second predetermined position.

18. An activation device according to claim 16, wherein the fixed component is a bolt of the adjuster.

19. An activation device according to claim 18, wherein there is a slot in the hand lever, and the bolt of the adjuster extends into the slot and functions as a stop.

20. An activation device according to claim 18, in combination with the adjuster and the vehicle seat, with the adjuster adjustably connecting components of the vehicle seat.

21. An activation device for an adjuster of a vehicle seat, with the activation device being responsive to a crash of a vehicle carrying the activation device, the activation device comprising:

a hand lever eccentrically mounted for pivoting in response to manual activation of the hand lever, wherein the pivoting of the hand lever is operative to unlock the adjuster and thereby enable operation of the unlocked adjuster; and an acceleration-sensitive device mounted for moving from a first predetermined position into a second predetermined position in response to the crash, wherein the acceleration-sensitive device is operative for:

allowing the pivoting of the hand lever, so as to allow the unlocking of the adjuster, while the acceleration-sensitive device is in the first predetermined position, and preventing the unlocking of the adjuster, by restricting the pivoting of the hand lever, while the pendulum is in the second predetermined position.

* * * * *